2,995,815
WELDING ROD AND METHOD OF MAKING AND WELDING WITH SAME

Ronald Herbert Thomas Dixon, Erdington, Birmingham, and Dennis Raymond Thorneycroft, Edenbridge, Kent, England, assignors to The International Nickel Company, Inc., New York, N.Y., a corporation of Delaware
No Drawing. Filed Mar. 8, 1960, Ser. No. 13,450
7 Claims. (Cl. 29—498)

The present invention relates to the oxy-acetylene welding of ductile iron and, more particularly, to a special filler weld rod having a special composition which produces ductile iron welds having good mechanical properties.

Spheroidal graphite cast iron or ductile iron is a well-established engineering material having a unique combination of properties associated with the fact that graphite present in the material is controlled to occur in the spheroidal form. Although this engineering material is relatively recent in origin, it has been widely adopted in industry and standard designations, including ASTM designations A–395–56T, A–339–55 and A–396–58, have been adopted by the American Society for Testing Materials to define the various standard grades of the material which are commercially available in the United States. B.S.S. No. 2789 has been adopted in relation to ductile iron grades available in the U.K.

There are applications of ductile iron where oxy-acetylene welding is the most appropriate process to apply. The requirements may be, for instance, with the deposition of a small quantity of iron, as the reclamation of the castings in the foundry or the replacement of iron surfaces worn in service, or for the fabrication of castings where it is important to have weld metal of composition and properties similar to those of the parent material.

In joining parts of gray cast iron by oxy-acetylene welding, it is difficult to obtain joints having mechanical properties comparable to those of the surrounding metal owing to the formation of a high proportion of eutectic carbide when the molten metal in the weld zone solidifies. This phenomenon, which is particularly troublesome in small welds, has the effect of making the joints hard and unmachinable and has an adverse effect on the mechanical properties of the joint. The adverse effects of weld structure can be overcome by subjecting the article to an annealing treatment but this is not usually practicable where the article is large.

Although attempts were made to overcome the foregoing difficulties and other difficulties, none, as far as we are aware, was entirely successful when carried into practice commercially on an industrial scale.

We have found that improved welds can be obtained by the use of a filler rod of a special composition.

It is an object of the present invention to provide a filler rod of special composition for use in oxy-acetylene welding of ductile iron.

Another object of the invention is to provide a method for oxy-acetylene welding of ductile iron and cast iron wherein the filler rod of a special composition is employed.

Generally speaking, the improved filler rod provided in accordance with this invention which is suitable for use in the oxy-acetylene welding of cast iron contains from about 3.5% to 4.5% carbon, from about 2% to 3% silicon, not more than about 0.15% manganese, about 0.01% to 0.2% magnesium, from 3% to 7% nickel, from about 0.05% to 0.2% aluminum, up to about 2% cobalt and the balance apart from impurities being substantially all iron.

Usually special procedures are required to completely exclude manganese. Where these are not practicable, the amount present should be kept as small as possible. When cobalt is present in the filler rod, it has the effect of producing a softer weld in very small beads.

One preferred composition is 3.8% carbon, 2.5% silicon, less than 0.1% manganese, 0.06% aluminum, 0.06% magnesium, 5% nickel and the balance iron.

It is important that the carbon content of the filler rod be at least about 3.5% to ensure a soft weld, because at low carbon levels the graphitizing tendency of iron is much less than carbides appear in the weld deposit. It is also important that the carbon content should not exceed 4.5% in order to avoid excessive quantities of kish (hypereutectic) graphite since such graphite weakens the weld deposit. In special circumstances, when small amounts of carbide may be tolerated in the weld deposit, the carbon content of the filler rod may be as low as about 3.3%. Likewise, the silicon content should be maintained in the range of about 2% to about 3% since below about 2% silicon there is a tendency to form carbide in the weld deposit whereas with silicon contents above about 3% undesirable impact properties are produced in the weld deposit. Nickel is an important constituent in the filler rod composition and should be maintained in the range of about 3% to 7% because nickel contents below 3% are inadequate to obviate the presence of carbide while if the nickel content is more than 7%, there is a strong tendency to produce very hard martensitic matrix structures in the weld deposit, particularly in small section welds. Aluminum contributes to the self-inoculating tendency of the rod by providing nucleating particles and should be present in an amount of at least about 0.05%. On the other hand, the aluminum content of the filler rod should not exceed about 0.2% as otherwise undesirable porosity is found to occur in weld deposits produced using the filler rod provided in accordance with the invention. The filler rod composition provided in accordance with the invention should not contain more than about 0.2% total of impurities such as sulfur, phosphorus, titanium, tin, lead, etc. Thus, the phosphorus content should not exceed about 0.10% because of its tendency to form phosphide constituents which have an adverse effect upon mechanical properties. Inasmuch as magnesium is an essential constituent of the special filler rod, the sulfur content thereof usually will not exceed about 0.02%. Elements having a strong carbide forming tendency such as chromium should not be present in amounts exceeding about 0.1%.

In order to give those skilled in the art a better understanding of the invention, the following illustrative examples are given:

EXAMPLE I

Using a filler rod composition containing about 3.8% carbon, about 2.5% silicon, about 5% nickel, less than about 0.1% manganese, about 0.06% aluminum, about 0.06% magnesium and the balance essentially iron, butt joints were made in plates of pearlitic ductile iron having respective section thicknesses of ½ inch, 1 inch and 2 inches. The pearlitic ductile iron in the plates contained about 3.4% carbon, about 2.1% silicon, about 0.4% manganese, about 0.08% magnesium and the balance essentially iron. Normal oxyacetylene welding procedures were employed, including the use of a proprietary cast iron gas welding flux. The ½-inch thick plates were beveled at one edge using an angle of 45° such that when the two plates were placed together a V groove having an included angle of 90° was produced. In welding the 1-inch and 2-inch thick plates, a double V groove was employed such that a V goove having an included angle of 90° was presented at each side of the plates to be joined.

After completion of welding, the plates were sectioned along parallel lines perpendicular to the weld. Portions of the welded plates were subjected to tensile testing across the weld in the as-welded condition. Portions of the welded material in the ½-inch and 1-inch plates were subjected to a ferritizing anneal comprising heating for 3 hours at 900° C., followed by a heating for 16 hours at 700° C. The results of the tensile tests are shown in the following table:

*Table I*

| Thickness of plate | Heat Treatment | Size of cross section of parallel portion of test piece | Tensile Properties | | |
|---|---|---|---|---|---|
| | | | Y.S., t.s.i. | U.T.S., t.s.i. | Percent El., 2 in. |
| ½ in. | A | 1″ x 0.45″ | 33.5 | 46.7 | 2½ |
| | | | 40.0 | 46.5 | 2½ |
| | | | 37.9 | 42.5 | 2 |
| | B | 1″ x 0.44″ | 25.8 | 29.4 | 7 |
| | | 1″ x 0.51″ | 23.7 | 27.8 | 5½ |
| | | 1″ x 0.44″ | 27.0 | 29.6 | 5½ |
| 1 in. | A | 1″ x 0.875″ | 36.1 | 37.6 | 2 |
| | | | 31.0 | 37.0 | 2½ |
| | | | 36.6 | 40.2 | 2½ |
| | B | 1″ x 0.88″ | 25.0 | 28.0 | 6½ |
| | | | 23.4 | 29.5 | 9 |
| | | | 24.5 | 28.0 | 8 |
| 2 in. | A | 1″ x 1.13″ (center of joint) | n.d. | 38.2 | 3 |
| | | 1″ x 0.505″ (top of joint) | 36.0 | 41.7 | 1½ |
| | | | 35.5 | 41.3 | 1½ |

A—as welded.
B—3 hrs. at 900° C., plus 16 hrs. at 700° C.
n.d.—not determined.
t.s.i.—long tons per square inch.

Portions of the welded metal produced in the ½-inch ductile iron plate were machined to a Charpy impact test bar 10 millimeters by 10 millimeters by 55 millimeters long and were subjected to the Charpy impact test in the unnotched condition at a temperature of 20° C. such that the blow was applied at the center of the weld. The results on three tests were 9 foot pounds, 11½ foot pounds and 11½ foot pounds, respectively. All the welds contained fine spheroidal graphite. Impact specimens of further welds made in the same manner were subjected to a ferritizing treatment comprising a heating for three hours at 900° C., followed by a further heating for 16 hours at 700° C. and were subjected to Charpy impact tests in the unnotched condition over the temperature range of minus 100° C. to 55° C. The tests demonstrated that the weld metal had a low impact transition temperature of approximately minus 50° C.

In contrast to the foregoing results, single V welds were made in similar ½-inch pearlitic ductile iron plate to that employed in the foregoing example using oxyacetylene welding with a filler rod outside the present invention and containing 3.4% carbon, 2.1% silicon, 0.35% manganese, 0.8% nickel, 0.08% magnesium, 0.01% sulfur, 0.03% phosphorus and the balance essentially iron. When subjected to tensile tests and impact tests similar to those described in the foregoing example, ultimate tensile strengths of 18 to 27 long tons per square inch, an elongation on 2 inches of 2 to 2½% and a Charpy impact strength (unnotched) of 3½ to 6½ foot pounds were obtained.

EXAMPLE II

In order to demonstrate that weld metal laid down using the filler rod of the present invention with the oxy-acetylene method is readily amenable to softening by heating, single piece beads were laid on top of a ½ inch thick plate of pearlitic ductile iron using the same filler rod described in Example I. The hardness of the as-deposited weld metal ranged from about 405 to 420 Vickers. A portion of the weld metal was subjected to a simple flame tempering treatment for about 2 minutes applied with the torch after welding. The hardness of the tempered weld metal ranged from about 330 to about 360 Vickers. Another portion of the same weld metal was tempered for ½ hour at 600° C. after which the hardness thereof ranged from about 270 to about 285 Vickers. In contrast thereto, a single bead weld having the same thickness produced using a filler rod outside the present invention and containing about 3.4% carbon, about 2.1% silicon, about 0.35% manganese, about 0.8% nickel and about 0.08% magnesium, with the balance essentially iron, gave a hardness reading under the respective conditions as aforesaid of 455 to 550 Vickers (as deposited), 500 to 600 Vickers (after the flame tempering for 2 minutes) and 425 to 470 Vickers (after tempering for 1½ hours at 600° C.).

The readiness with which the weld bead produced using the filler rod in accordance with the invention was softened by tempering demonstrates that it contained martensite as the hard constituent whereas the weld bead produced using the filler rod outside the invention contained eutectic carbide which can be softened by heat treatment only with difficulty.

Filler rods produced in accordance with the invention may readily be produced by casting molten metal of the required composition into graphite chill molds. Alternatively, large cast ingots or billets of the required ductile iron composition in accordance with the invention can be cast and the cast metal can be reduced to the required size for use as an oxy-acetylene filler rod by hot working. In this connection, the special filler rod composition in accordance with this invention is particularly amenable to hot working.

In using the special filler rod in accordance with the invention, only the preheating procedures normally required for oxy-acetylene welding are needed to provide sufficient heat in the weld zone, to enable both workpiece and filler rod to be fused under the torch, and to maintain a molten weld puddle. Naturally, thick sections, say 2 inches thick, require more heat for preheating than thin sections, say ½ inch thick. While in the former circumstance heat may be introduced through the use of furnaces, in the latter circumstance it may suffice and indeed be more convenient to use the heat of the welding torch for preheating purposes.

After welding cast iron by the oxy-acetylene process, it is customary to delay cooling in the weld zone by covering the heated part with a blanket of insulating material, or by cooling in a furnace or by gradually withdrawing the welding flame. The procedure used depends primarily on the size and complexity of the component. Such procedures could be followed with advantage after welding with the rod of the present invention. However, if rapid cooling follows the welding operation, then the hard martensitic product likely to be present in small welds can be softened by a tempering or post-weld heat treatment conducted in a manner such that the temperature of the weld zone does not rise above about 650° C.

The use of the filler rods according to the invention in the oxy-acetylene welding of gray cast iron enables welds to be deposited which contain only small amounts of eutectic carbide and thereby have improved mechanical properties.

Particularly satisfactory results are obtained when filler rods according to the invention are used in combination with a welding flux consisting of borax containing an inoculant for the graphitization of cast iron, e.g., calcium silicide or ferrosilicon. The proportion of inoculant may, for example, be 25% to 40% by weight.

The filler rods are most useful in joining parts consisting of high strength gray cast iron, in particular those of spheroidal graphite cast iron, that is to say cast iron in which the graphite is wholly or partly in the spheroidal form owing to the incorporation of a small quantity of a suitable addition agent, e.g., magnesium, into the iron. Other high strength gray cast irons include the so-called acicular cast irons and high-grade flake graphite irons obtained by inoculation and alloying.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An alloy filler rod for oxy-acetylene welding consisting essentially of iron with about 3.5% to about 4.5% carbon, about 2% to 3% silicon, not more than about 0.15% manganese, about 0.01% to 0.2% magnesium, about 3% to 7% nickel, about 0.05% to 0.2% aluminum, and up to about 2 cobalt.

2. A ductile cast iron alloy composition consisting essentially of iron with about 3.5% to about 4.5% carbon, about 2% to 3% silicon, not more than about 0.15% managnese, about 0.01% to 0.2% magnesium, about 3% to 7% nickel, about 0.05% to 0.2% aluminum, and up to about 2% cobalt, said cast iron composition being characterized when used as a filler rod for oxy-acetylene welding by the production of sound welds containing spheroidal graphite and being substantially free of eutectic carbide.

3. The method for welding an alloy cast iron workpiece which comprises preparing a filler rod consisting essentially of iron with about 3.5% to about 4.5% carbon, about 2% to 3% silicon, not more than about 0.15% manganese, about 0.01% to 0.2% magnesium, about 3% to 7% nickel, about 0.05% to 0.2% aluminum, and up to about 2% cobalt, locally heating a portion of said workpiece with an oxy-acetylene flame to form a puddle of molten cast iron and fusing a portion of said filler rod into said puddle by means of an oxy-acetylene flame to form a weld containing spheroidal graphite and being substantially devoid of eutectic carbide.

4. The method for producing an oxy-acetylene welding filler rod for use in joining cast iron workpieces which comprises establishing a molten cast iron bath consisting essentially of iron with about 3.5% to about 4.5% carbon, about 2% to 3% silicon, not more than 0.15% manganese, about 0.01% to 0.2% magnesium, about 3% to 7% nickel, about 0.05% to 0.2% aluminum, and up to about 2% cobalt, casting metal from said bath into an ingot and hot rolling said ingot into rod form.

5. An alloy filler rod for oxy-acetylene welding consisting essentially of iron with about 3.3% to about 4.5% carbon, about 2% to 3% silicon, not more than about 0.15% manganese, about 0.01% to 0.2% magnesium, about 3% to 7% nickel, about 0.05% to 0.2% aluminum, and up to about 2% cobalt.

6. A ductile cast iron alloy composition consisting essentially of iron with about 3.8% carbon, about 2.5% silicon, not more than about 0.1% manganese, about 0.06% aluminum, about 0.06% magnesium and about 5% nickel, said alloy composition being characterized when used as a filler rod for oxy-acetylene welding by the production of sound welds containing spheroidal graphite and being substantially free of eutectic graphite.

7. The method according to claim 3 wherein the alloy filler rod consists essentially of iron with about 3.8% carbon, about 2.5% silicon, not more than about 0.1% manganese, about 0.06% aluminum, about 0.06% magnesium and about 5% nickel.

References Cited in the file of this patent

UNITED STATES PATENTS

| | | |
|---|---|---|
| 2,485,760 | Millis et al. | Oct. 25, 1949 |
| 2,690,392 | Millis et al. | Sept. 28, 1954 |
| 2,770,871 | Demalander | Nov. 20, 1956 |
| 2,789,898 | Crome | Apr. 23, 1957 |

UNITED STATES PATENT OFFICE

CERTIFICATE OF CORRECTION

Patent No. 2,995,815  August 15, 1961

Ronald Herbert Thomas Dixon et al.

It is hereby certified that error appears in the above numbered patent requiring correction and that the said Letters Patent should read as corrected below.

In the heading to the printed specification, between lines 9 and 10, insert -- Claims priority, application Great Britain Mar. 13, 1959 --.

Signed and sealed this 27th day of March 1962.

(SEAL)
Attest:

ERNEST W. SWIDER
Attesting Officer

DAVID L. LADD
Commissioner of Patents